Patented Oct. 7, 1941

2,257,988

UNITED STATES PATENT OFFICE 2,257,988

PROCESS OF PRODUCING ALUMINIUM ALLOYS

Robert Suchy and Hellmuth Seliger, Bitterfeld, Germany, assignors, by mesne assignments, to Walther H. Duisberg, New York, N. Y.

No Drawing. Application January 22, 1938, Serial No. 186,305. In Germany January 29, 1937

5 Claims. (Cl. 75—138)

This invention relates to a process for the production of alloys of aluminium with calcium.

In a known process, aluminium-calcium alloys are produced by heating calcium oxide and an excess of aluminium to high temperatures. A portion of the aluminium present is consumed in the reduction of the calcium oxide to metal, whilst the remainder alloys with the calcium produced. Up to the present, such process has been most advantageously carried out by adding highly superheated molten aluminium to burnt lime in lump form. This process, however, has the drawback that, in addition to the aluminium-calcium-alloy, a residue is formed which is fusible only with difficulty and which contains considerable amounts of metallic inclusions.

The present invention aims at obviating the foregoing drawbacks and at providing a method of carrying out the foregoing process, in which a fluid slag is formed which readily separates from the aluminium-calcium alloy.

To this end, according to the invention, the reaction vessel, which preferably is made of graphite, is charged with aluminium ingot and with moulded bodies (briquettes) composed of ground, burnt lime and aluminium granules. The proportions of lime and aluminium in the briquetted mixture are preferably selected in such a manner as to yield a calcium aluminate slag having the lowest possible melting point. This object is best attained by the formation of a slag consisting of lime and alumina in approximately equal parts by weight. Since 2 molecules of Al can reduce 3 molecules of CaO, a mixture containing 168 parts by weight of CaO and 54 parts by weight of Al, will furnish 120 parts by weight of Ca and 102 parts by weight of $Al_2O_3$. In order to obtain a calcium aluminate slag consisting of equal parts by weight of CaO and $Al_2O_3$, a further addition of 102 parts by weight of CaO is needed, the total charge therefore consisting of 270 parts by weight of CaO and 54 parts by weight of Al.

The materials charged into the reaction vessel are heated to a temperature of about 1500° C. and are maintained at that temperature until the reaction between the components of the briquettes is completed and an alloy has been formed between the calcium formed and the aluminium in which the briquettes are immersed.

The calcium aluminate slag produced separates completely from the specifically lighter aluminium-calcium-alloy and sinks to the bottom, so that the alloy and slag can be tapped off separately.

Aluminium-calcium alloys containing up to about 50% of calcium can be produced by means of the her-in-described process.

The reaction vessel may be heated in any suitable manner. A particularly suitable type of furnace for carrying out the process of the present invention is a tilting high-frequency furnace of customary construction.

Example

The graphite crucible of a high-frequency electric furnace was charged with a mixture numerically calculated, in accordance with the foregoing considerations, for a theoretical yield of an aluminium-calcium alloy containing 33% of calcium, such mixture consisting of 667 parts by weight of aluminium, in lump form, and 940 parts by weight of briquettes consisting of a mixture of 790 parts by weight of (95%) calcium oxide and 150 parts by weight of aluminium granules. The charge material was heated to 1500° C. in the high-frequency furnace, and melted. After the termination of the reaction and after the alloy and the slag had separated into two layers, these layers were poured, in succession, into different receivers. 900 parts of a calcium-aluminium-alloy, containing 27% of calcium and 69% of aluminium, together with a small amount of metallic impurities, were obtained, corresponding to a yield of 88% referred to the original charge of aluminium.

In carrying out the invention, the ratio of the quantity of aluminium ingot to the quantity for briquettes of reaction mixture should be such that (bearing in mind that the yield of metallic calcium is not 100%) the metallic calcium actually produced during the reaction, in accordance with the mechanism of the reaction as hereinbefore described, is sufficient to make up an alloy of the desired composition with the aluminium derived from the ingots.

We claim:

1. A process for the production of aluminium calcium alloys, which comprises causing moulded bodies comprising a mixture of ground burnt lime and aluminium in comminuted form, to react, at temperatures of the order of 1500° C., in contact with a mass of molten aluminium, and separating the non-metallic products of the reaction from the molten aluminium calcium alloy formed.

2. A process for the production of aluminium-calcium alloys which comprises causing moulded bodies comprising a mixture of ground burnt lime and aluminium in comminuted form, to react, at temperatures of the order of 1500° C., in contact with a mass of molten aluminium, the proportion of lime in said moulded bodies in relation to the comminuted aluminium being so selected as to enable a calcium aluminate slag to be formed after substantially all the aluminium in comminuted form has reacted with the calcium oxide present so as to yield metallic calcium and alumina, which calcium aluminate slag, by virtue of the ratio of calcium oxide to alumina present therein, is molten at the reaction temperature, and separating the supernatant molten slag from the molten aluminium calcium alloy formed.

3. A process for the production of aluminium-calcium alloys which comprises causing moulded bodies comprising a mixture of ground burnt lime and aluminium in comminuted form, to react, at temperatures of the order of 1500° C., in contact with a mass of molten aluminium, the proportion of lime in said moulded bodies, in relation to the comminuted aluminium, being so selected as to enable a calcium aluminate slag consisting of approximately equal parts by weight of CaO and $Al_2O_3$ to be formed after substantially all the aluminium in comminuted form has reacted with the calcium oxide present so as to yield metallic calcium and alumina, which calcium aluminate slag, by virtue of the ratio of calcium oxide to alumina present therein, is molten at the reaction temperature, and separating the supernatant molten slag from the molten aluminium calcium alloy formed.

4. A process for the production of aluminium calcium alloy which comprises heating solid aluminium and molded bodies comprising a mixture of ground, burnt lime and an amount of comminuted aluminium sufficient to set free from the lime the calcium required for the alloy to a temperature of the order of 1500° C., causing the aluminium and burnt lime to react and separating the non-metallic product of the reaction from the molten aluminium calcium alloy formed.

5. A process as defined in claim 4 wherein the burnt lime in the molded bodies is present in sufficient excess to provide a liquid calcium aluminate slag composed of approximately equal parts of lime and alumina.

ROBERT SUCHY.
HELLMUTH SELIGER.